US009846580B2

(12) United States Patent
Fujisawa et al.

(10) Patent No.: US 9,846,580 B2
(45) Date of Patent: Dec. 19, 2017

(54) ARITHMETIC PROCESSING DEVICE, ARITHMETIC PROCESSING SYSTEM, AND METHOD FOR CONTROLLING ARITHMETIC PROCESSING DEVICE

(71) Applicant: FUJITSU LIMITED, Kawasaki-shi, Kanagawa (JP)

(72) Inventors: Kenji Fujisawa, Kawasaki (JP); Yuji Shirahige, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 551 days.

(21) Appl. No.: 14/524,244

(22) Filed: Oct. 27, 2014

(65) Prior Publication Data
US 2015/0149724 A1 May 28, 2015

(30) Foreign Application Priority Data

Nov. 22, 2013 (JP) .................................. 2013-242191

(51) Int. Cl.
G06F 9/30 (2006.01)
G06F 9/38 (2006.01)
G06F 12/08 (2016.01)
G06F 12/0855 (2016.01)
G06F 12/0815 (2016.01)
G06F 12/0875 (2016.01)
G06F 12/0811 (2016.01)

(52) U.S. Cl.
CPC ........ G06F 9/30087 (2013.01); G06F 9/3869 (2013.01); G06F 12/0815 (2013.01); G06F 12/0855 (2013.01); G06F 12/0811 (2013.01); G06F 12/0875 (2013.01); G06F 2212/301 (2013.01); G06F 2212/452 (2013.01)

(58) Field of Classification Search
CPC ............ G06F 12/0855; G06F 12/0875; G06F 12/0811; G06F 12/0815; G06F 2212/452; G05F 9/3869; G05F 9/30087
See application file for complete search history.

(56) References Cited

U.S. PATENT DOCUMENTS 7,571,270 B1 * 8/2009 Nemirovsky ......... G06F 13/364 710/200
2002/0174305 A1 * 11/2002 Vartti .................. G06F 12/0804 711/144

(Continued)

FOREIGN PATENT DOCUMENTS

JP 4-65736 3/1992

Primary Examiner — Ann J Lo
Assistant Examiner — Jane Wei
(74) Attorney, Agent, or Firm — Staas & Halsey LLP

(57) ABSTRACT

An arithmetic processing device includes: a arithmetic cores, wherein the arithmetic core comprises: an instruction controller configured to request processing corresponding to an instruction; a memory configured to store lock information indicating that a locking target address is locked, the locking target address, and priority information of the instruction; and a cache controller configured to, when storing data of a first address in a cache memory to execute a first instruction including locking of the first address from the instruction controller, suppress updating of the memory if the lock information is stored in the memory and a priority of the priority information is higher than a first priority of the first instruction.

19 Claims, 15 Drawing Sheets

(56) References Cited

U.S. PATENT DOCUMENTS

| | | | | |
|---|---|---|---|---|
| 2008/0059723 A1* | 3/2008 | Math | ................ | G06F 9/524 |
| | | | | 711/154 |
| 2010/0161573 A1* | 6/2010 | Chan | ................ | G06F 9/52 |
| | | | | 707/704 |
| 2011/0072320 A1* | 3/2011 | Miura | ................ | G06F 11/073 |
| | | | | 714/54 |
| 2012/0005684 A1* | 1/2012 | Ziarek | ................ | G06F 9/528 |
| | | | | 718/103 |
| 2013/0297047 A1* | 11/2013 | Sullivan | ................ | G05B 19/0423 |
| | | | | 700/56 |
| 2013/0318259 A1* | 11/2013 | Sherman | ................ | A61N 1/025 |
| | | | | 710/25 |

* cited by examiner

FIG. 11

| CNT = THRESHOLD VALUE | CODE IN LOCK REGISTER | CODE FROM MIB | LOCK REGISTER UPDATE |
|---|---|---|---|
| TRUE | Don't Care | Don't Care | TRUE |
| FALSE | CAS | CAS | TRUE |
| FALSE | CAS | $\overline{\text{CAS}}$ | FALSE |
| FALSE | $\overline{\text{CAS}}$ | CAS | TRUE |
| FALSE | $\overline{\text{CAS}}$ | $\overline{\text{CAS}}$ | TRUE |

FIG. 14

| CNT = THRESHOLD VALUE | TOQ FROM MIB | CODE FROM MIB | TOQ IN LOCK REGISTER | CODE IN LOCK REGISTER | LOCK REGISTER UPDATE |
|---|---|---|---|---|---|
| TRUE | Don't Care | Don't Care | Don't Care | Don't Care | TRUE |
| FALSE | TRUE | CAS | TRUE | CAS | TRUE |
| FALSE | TRUE | CAS | TRUE | $\overline{CAS}$ | TRUE |
| FALSE | TRUE | CAS | FALSE | CAS | TRUE |
| FALSE | TRUE | CAS | FALSE | $\overline{CAS}$ | TRUE |
| FALSE | TRUE | $\overline{CAS}$ | TRUE | CAS | FALSE |
| FALSE | TRUE | $\overline{CAS}$ | TRUE | $\overline{CAS}$ | TRUE |
| FALSE | TRUE | $\overline{CAS}$ | FALSE | CAS | TRUE |
| FALSE | TRUE | $\overline{CAS}$ | FALSE | $\overline{CAS}$ | TRUE |
| FALSE | FALSE | CAS | TRUE | CAS | FALSE |
| FALSE | FALSE | CAS | TRUE | $\overline{CAS}$ | FALSE |
| FALSE | FALSE | CAS | FALSE | CAS | TRUE |
| FALSE | FALSE | CAS | FALSE | $\overline{CAS}$ | TRUE |
| FALSE | FALSE | $\overline{CAS}$ | TRUE | CAS | FALSE |
| FALSE | FALSE | $\overline{CAS}$ | TRUE | $\overline{CAS}$ | FALSE |
| FALSE | FALSE | $\overline{CAS}$ | FALSE | CAS | FALSE |
| FALSE | FALSE | $\overline{CAS}$ | FALSE | $\overline{CAS}$ | TRUE |

FIG. 15

| SUBSEQUENT / PRECEDING | IU*TOQ | IU*$\overline{TOQ}$ | CAS*TOQ | CAS*$\overline{TOQ}$ | TRF*TOQ | TRF*$\overline{TOQ}$ | ST1 |
|---|---|---|---|---|---|---|---|
| IU*TOQ | TRUE | FALSE | TRUE | FALSE | TRUE | FALSE | TRUE |
| IU*$\overline{TOQ}$ | TRUE | TRUE | TRUE | TRUE | TRUE | TRUE | TRUE |
| CAS*TOQ | FALSE | FALSE | FALSE | FALSE | FALSE | FALSE | FALSE |
| CAS*$\overline{TOQ}$ | TRUE | FALSE | TRUE | TRUE | TRUE | FALSE | TRUE |
| TRF*TOQ | FALSE | FALSE | TRUE | FALSE | TRUE | FALSE | TRUE |
| TRF*$\overline{TOQ}$ | TRUE | FALSE | TRUE | TRUE | TRUE | TRUE | TRUE |
| ST1 | FALSE | FALSE | FALSE | FALSE | FALSE | FALSE | TRUE |

ARITHMETIC PROCESSING DEVICE, ARITHMETIC PROCESSING SYSTEM, AND METHOD FOR CONTROLLING ARITHMETIC PROCESSING DEVICE

CROSS-REFERENCE TO RELATED APPLICATION

This application is based upon and claims the benefit of priority from the prior Japanese Patent Application No. 2013-242191 filed on Nov. 22, 2013, the entire contents of which are incorporated herein by reference.

FIELD

The embodiments discussed herein are related to an arithmetic processing device, an arithmetic processing system, and a method for controlling an arithmetic processing device.

BACKGROUND

In arithmetic processing devices, memory access is carried out based on atomic instructions that execute a plurality of processes in an indivisible manner. Atomic instructions refer to instructions that guarantee the obtaining of results that are the same as when a plurality of processes have been executed in a predetermined order. In the execution of atomic instructions, target data is protected by locking-target addresses being registered and locked in a lock register.

Related technology is disclosed in Japanese Laid-open Patent Publication No. 4-65736.

SUMMARY

According to an aspect of the embodiments, an arithmetic processing device includes: a arithmetic cores, wherein the arithmetic core comprises: an instruction controller configured to request processing corresponding to an instruction; a memory configured to store lock information indicating that a locking target address is locked, the locking target address, and priority information of the instruction; and a cache controller configured to, when storing data of a first address in a cache memory to execute a first instruction including locking of the first address from the instruction controller, suppress updating of the memory if the lock information is stored in the memory and a priority of the priority information is higher than a first priority of the first instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 depicts an example of a truth value table for updating a lock register;
FIG. 14 depicts an example of a truth value table;
and
FIG. 15 depicts an example of an updating of a lock register.

DESCRIPTION OF EMBODIMENTS

Figure 1:
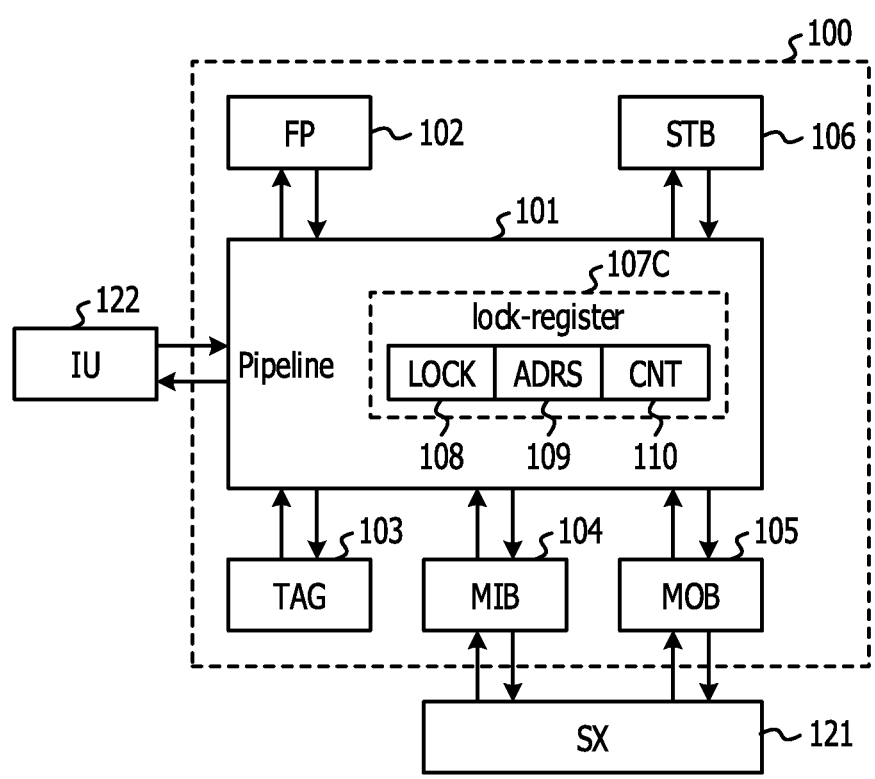
FIG. 1 depicts an example of a primary cache.

FIG. 1 depicts an example of a primary cache. FIG. 1 depicts a primary cache unit of a plurality of processor cores (hereafter referred to as "cores") that each function as an arithmetic processing unit and belong to a processor (multi-core processor). A primary cache control unit 100 of the primary cache unit includes a pipeline 101. The pipeline 101 of the primary cache control unit 100 receives a request from an instruction control unit (IU) 122 that controls the execution of instructions and so forth, and executes processing corresponding to the request. The pipeline 101 carries out an exchange of data and so forth with a fetch port (FP) 102, a tag unit (TAG) 103, a move-in buffer (MIB) 104, a move-out buffer (MOB) 105, or a store buffer (STB) 106.

The fetch port 102 has a plurality of entries in which requests are retained, and retains requests issued from the instruction control unit 122 and inserts the requests into the pipeline 101. The tag unit 103 carries out tag searches and so forth for determining whether or not the data requested by the requests is present in the primary cache memory. The store buffer 106 has a plurality of entries in which store requests are retained, and retains store requests issued from the instruction control unit 122 and inserts the store requests into the pipeline 101.

The move-in buffer 104 exchanges processing data regarding move-ins that transfer data for which a cache miss has occurred to a primary cache memory, with a secondary cache control unit (SX) 121 of a secondary cache unit that is shared by the plurality of cores. The move-out buffer 105 exchanges processing data regarding move-outs that eject data from the primary cache memory, with the secondary cache control unit 121.

A lock register 107C is a register that retains addresses that are locked by the pipeline 101, and one of which is allocated to each core. The lock register 107C includes a field 108 that retains a lock flag (LOCK) indicating whether or not locking is in effect, a field 109 that retains a locking-target address (ADRS), and a counter (CNT) 110.

Operations from a core other than the core that corresponds to the lock register 107C corresponding to the locking-target address registered in the lock register 107C for which the lock flag has been set (locked state), are prohibited. The lock register 107C is updated upon each move-in, and each core is able to lock one address at any given point in time. To ensure that the locked state does not continue, the counter 110 measures time, and the lock flag is cleared and the lock is released when a certain period of time elapses.

For example, in the counter 110, an initial value of 0 is set, and the value is incremented by 1 when a clock signal is input. For example, the value of the counter 110 is proportional to the elapsed time from a locking-target address being locked. If the value of the counter 110 reaches a threshold value, the lock flag of the lock register 107C is cleared, and the locking of the registered address is released.

Figure 2:
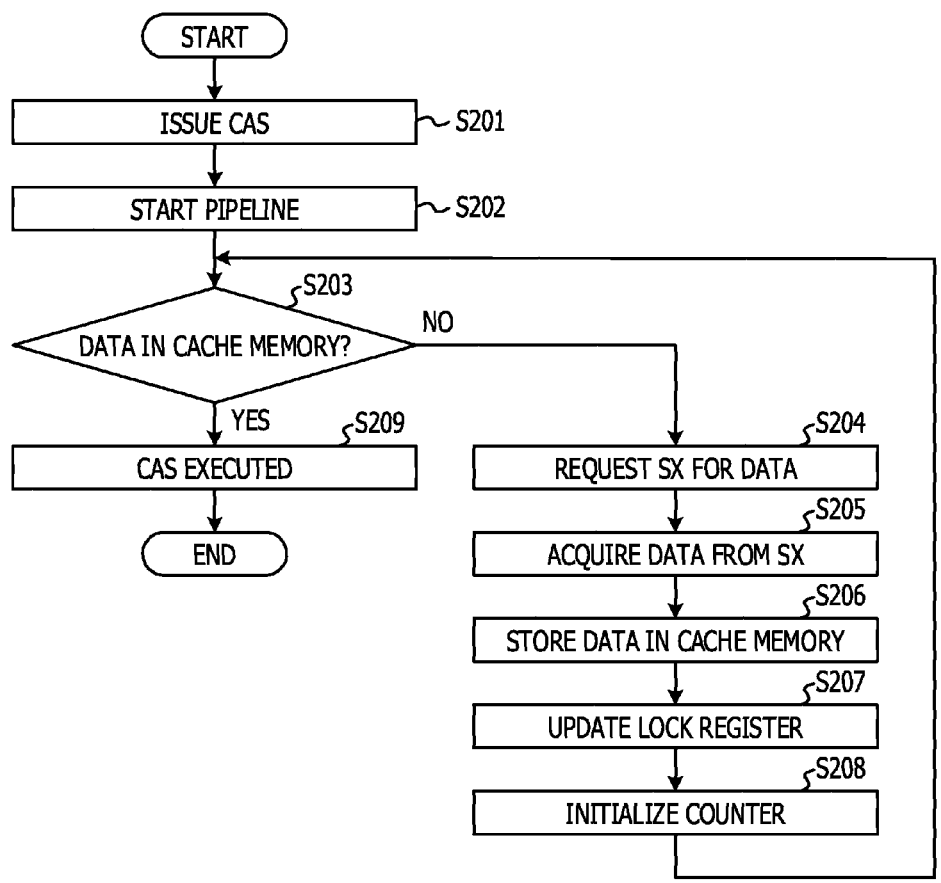
FIG. 2 depicts a processing example.

FIG. 2 depicts a processing example. In FIG. 2, processing that includes the updating of a lock register is depicted. If an instruction involving locking, for example, a compare and swap (CAS) instruction that executes data fetch processing, comparison processing, and store processing with one instruction, is issued from the instruction control unit 122 or the like (S201), the pipeline 101 of the primary cache control unit 100 initiates upon receiving a request for the issued instruction (S202). The pipeline 101 of the primary cache control unit 100 confirms whether or not the data which is used for the execution of the instruction is in the primary cache memory (S203).

If the result of the confirmation is that the data is not in the primary cache memory (NO in S203), the pipeline 101 of the primary cache control unit 100 issues a request for the data to the secondary cache control unit 121 (S204). When the pipeline 101 of the primary cache control unit 100 acquires the data from the secondary cache control unit 121 (S205), the acquired data is stored in the primary cache memory (S206).

After the data has been stored in the primary cache memory, the pipeline 101 of the primary cache control unit 100 updates the lock register 107C, sets the lock flag, stores and locks the locking-target address (S207). The pipeline 101 of the primary cache control unit 100 initializes the counter of the lock register 107C (S208). If it is confirmed that the data which is used for the execution of the instruction is in the primary cache memory (YES in S203), the pipeline 101 of the primary cache control unit 100 executes the processing of the CAS instruction.

Figure 3:
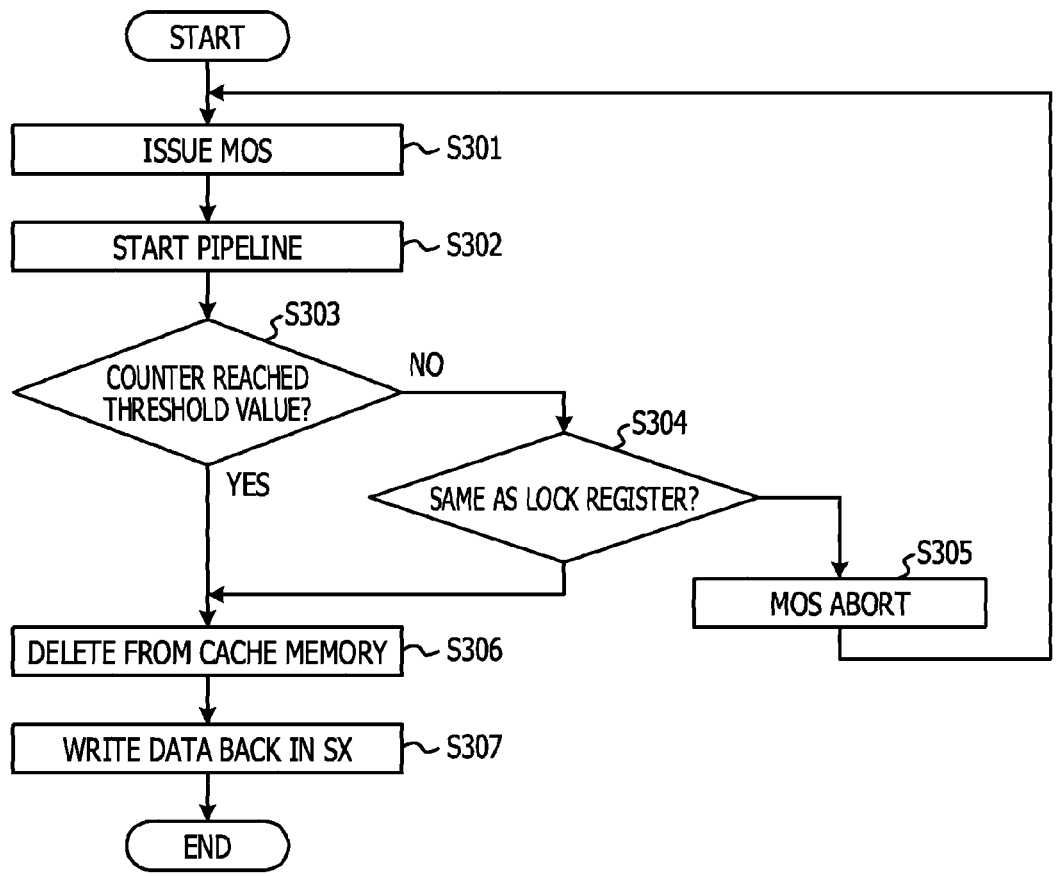
FIG. 3 depicts an example of lock control.

FIG. 3 depicts an example of lock control. In FIG. 3, lock control in which a lock register is used is depicted. If a MOS request that requests data from the secondary cache control unit 121 is issued (S301), the pipeline 101 of the primary cache control unit 100 initiates upon receiving the issued MOS request (S302). The pipeline 101 of the primary cache control unit 100 confirms the value of the counter 110 of the lock register 107C (S303).

If the result of the confirmation is that the value of the counter 110 has not reached the threshold value (NO in S303), the pipeline 101 of the primary cache control unit 100 compares the address of the requested data and the address registered in the lock register 107C (S304). If the addresses match each other (YES in S304), because the address of the requested data is locked, the MOS request from the secondary cache control unit 121 is aborted (S305).

If the value of the counter 110 has reached the threshold value (YES in S303), or if the address of the requested data and the address registered in the lock register 107C do not match (NO in S304), the MOS request continues because the address of the requested data is open. When the MOS request continues, the pipeline 101 of the primary cache control unit 100 deletes the requested data from the primary cache memory (S306), and carries out a write-back for the data in the secondary cache control unit 121 (S307).

Figure 4:
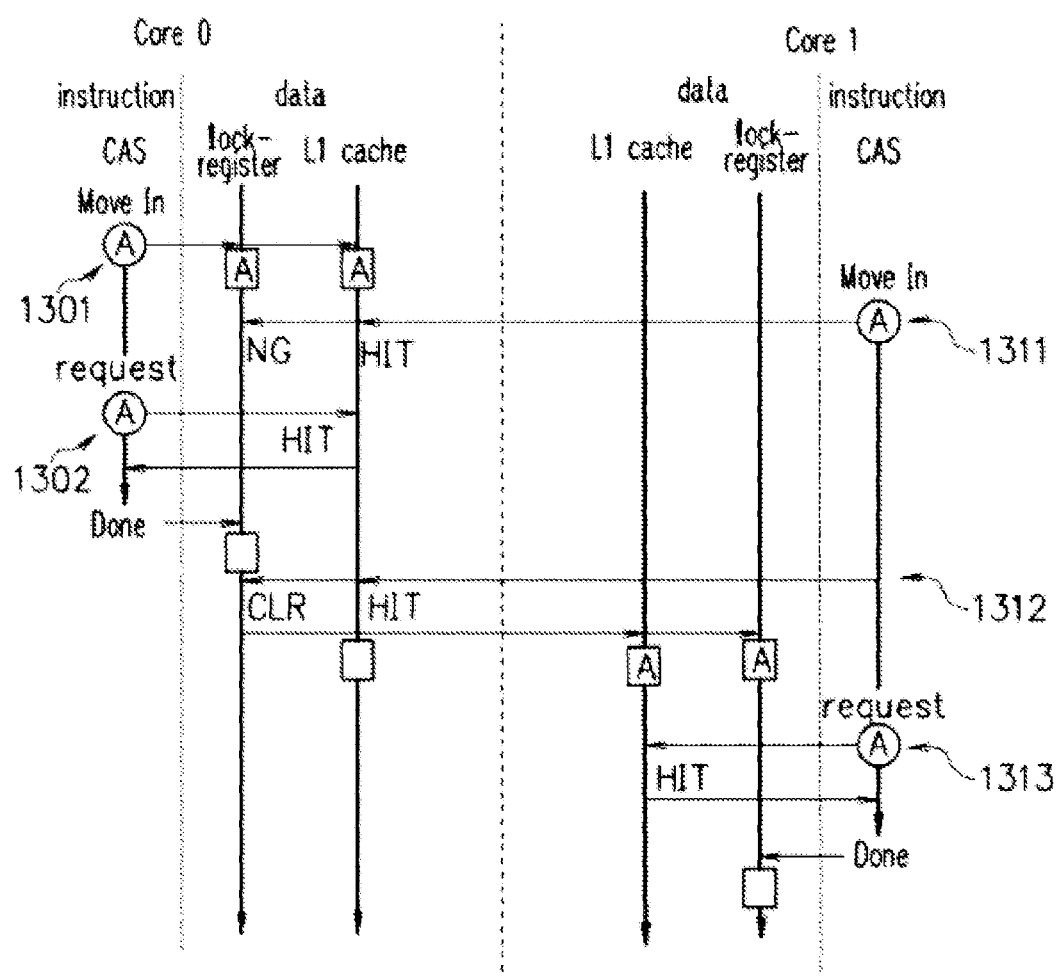
FIG. 4 depicts an example of lock control.

FIG. 4 depicts an example of lock control. FIG. 4 depicts a sequence indicating lock control that uses a lock register in the case where, in a processor having a plurality of cores, the plurality of cores execute instructions including therein a plurality of processes that are performed continuously. In FIG. 4, CAS instructions for which the access-target address is A is executed by a core 0 and a core 1.

In order for the core 0 to execute a CAS instruction for the address A, the pipeline 101 of the primary cache control unit 100 of the core 0 stores data of the address A for which a cache miss has occurred, in a primary cache memory by using a move-in. At this time, the pipeline 101 of the primary cache control unit 100 sets the lock flag in the lock register 107C, and also registers the address A as a locking-target address (1301). The address A is thereby locked.

Due to the address A being locked by the core 0, access to the address A by a core other than the core 0 is blocked. Consequently, a move-in for the data of the address A, for which the cache miss by the core 1, which executes a CAS instruction for the address A, has occurred, is aborted (1311). After the data of the address A has been stored in the primary cache memory of the core 0, the pipeline 101 of the primary cache control unit 100 of the core 0 executes the processing of the CAS instruction (1302). After the processing of the CAS instruction has been completed, the pipeline 101 of the primary cache control unit 100 of the core 0 updates the lock register 107C and clears the lock flag. For example, the locking of the address A is released, and access to the address A by all of the cores is allowed.

If a move-in for the address A by the core 1 is retried, because the address A is not locked, the data of the address A is moved-in from the primary cache memory of the core 0 to the primary cache memory of the core 1. At this time, the pipeline 101 of the primary cache control unit 100 of the core 1 sets the lock flag in the lock register 107C, and also registers the address A as a locking-target address (1312). The address A is thereby locked. After the data of the address A has been stored in the primary cache memory of the core 1, when the pipeline 101 of the primary cache control unit 100 of the core 1 executes the processing of the CAS instruction and the processing has been completed, the lock register 107C is updated and the lock flag is cleared (1313).

Figure 5:
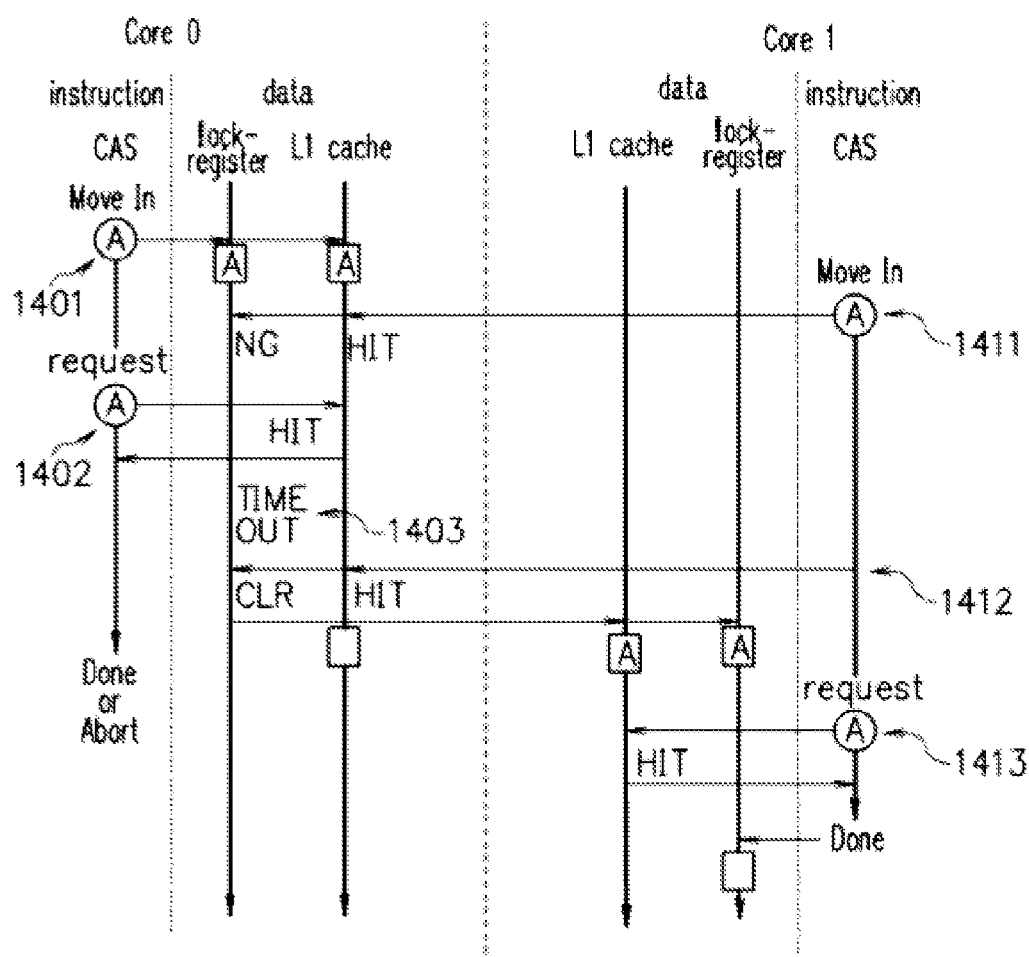
FIG. 5 depicts an example of lock cancellation.

FIG. 5 depicts an example of lock release. In FIG. 5, a sequence diagram for lock release due to a timeout is depicted. In FIG. 5, the core 0 and the core 1 each execute CAS instructions in which the access-target address is A. Processes 1401, 1411, and 1402 may each be substantially the same as or similar to the processes 1301, 1311, and 1302 depicted in FIG. 4. In process 1401, the address A is registered as the locking-target address in the lock register 107C of the core 0, and then, when a certain period of time elapses (a timeout occurs), the value of the counter 110 reaches the threshold value, and the locking of the address A is released (1403). The following processes 1412 and 1413 may each be substantially the same as or similar to the processes 1312 and 1313 depicted in FIG. 4.

In a memory control unit that controls access to a shared memory unit from a plurality of processing units, in a state in which an address is not locked, if writes to the lock register of the memory control unit are requested from the plurality of processing units at the same time, control may be performed to determine which write is given priority.

Figure 6:
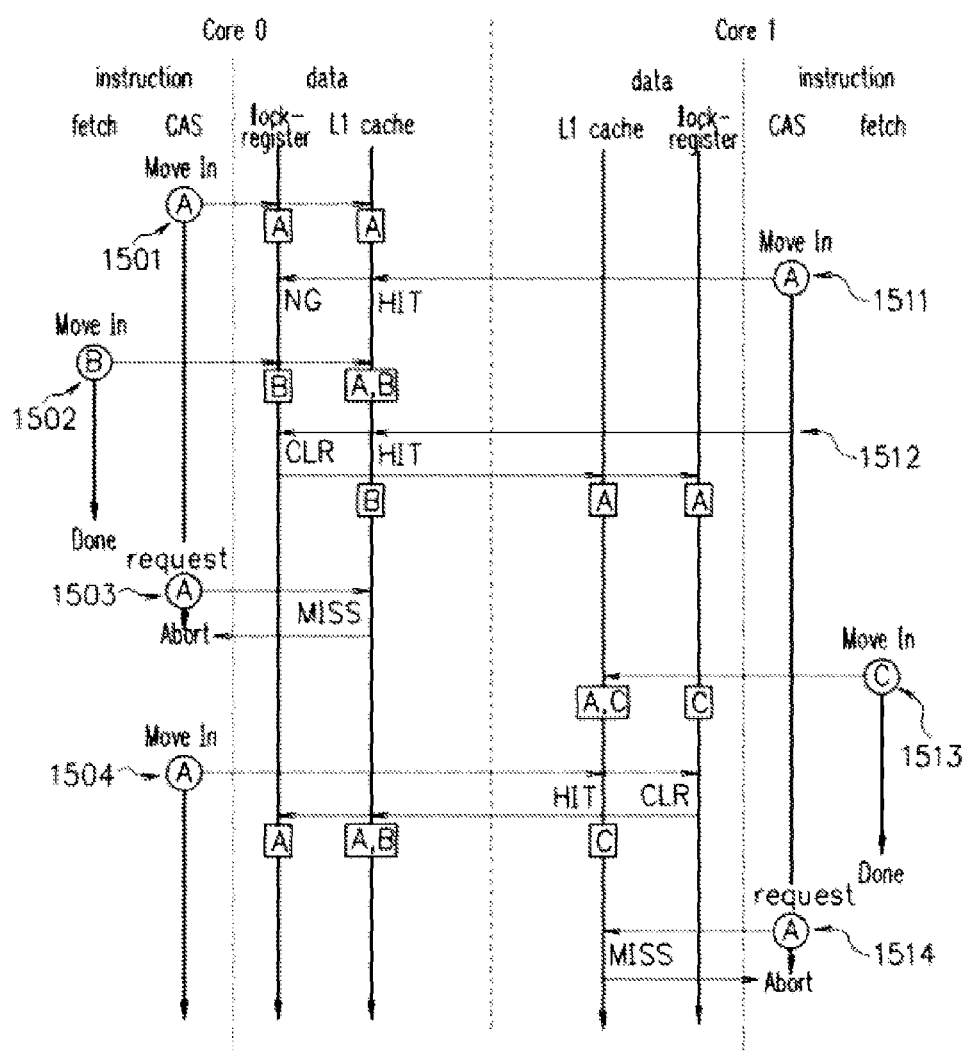
FIG. 6 depicts an example of lock control.

FIG. 6 depicts an example of lock control. In FIG. 6, lock control that uses a lock register of a processor having a plurality of cores is depicted, and processing stalls have mutually occurred. For example, there is no limit to the updating of the lock register, and when processing stalls occur in the core 0 and the core 1 as depicted in FIG. 6, the processing performance of the processor may decline.

In order to execute a CAS instruction, which is an instruction that involves locking, the pipeline 101 of the primary cache control unit 100 of the core 0 stores the data of the address A for which a cache miss has occurred, in the primary cache memory by using a move-in. At this time, the pipeline 101 of the primary cache control unit 100 updates the lock register 107C and registers the address A as a locking-target address and locks the address A (1501). Since the address A is locked by the core 0, a move-in for the data of the address A, for which the cache miss by the core 1, which executes a CAS instruction, has occurred, is aborted (1511).

After the address A has been locked by the core 0, in order to execute a page table fetch instruction, which is the subsequent instruction that involves locking, the pipeline 101 of the primary cache control unit 100 of the core 0 stores the data of an address B for which a cache miss has occurred, in the primary cache memory by using a move-in. At this time, the pipeline 101 of the primary cache control unit 100 updates the lock register 107C and registers the address B as a locking-target address and locks the address B (1502). Since one lock register is allocated to each core, by locking the address B, the locking of the address A is released.

After the locking of the address A has been released by the core 0, when a move-in for the address A by the core 1 is retried, because the address A is not locked, the data of the address A is moved-in from the primary cache memory of the core 0 to the primary cache memory of the core 1. At this time, the pipeline 101 of the primary cache control unit 100 of the core 1 updates the lock register 107C and registers the address A as a locking-target address and locks the address A (1512). In this way, when the data of the address A is deleted from the primary cache memory of the core 0 despite it being prior to the completion of the CAS instruction by the core 0, the CAS instruction implemented by the core 0 is stalled without being able to complete (1503).

After the address A has been locked by the core 1, in order to execute a page table fetch instruction, which is the subsequent instruction that involves locking, the pipeline 101 of the primary cache control unit 100 of the core 1 stores the data of an address C for which a cache miss has occurred, in the primary cache memory by using a move-in. At this time, the pipeline 101 of the primary cache control unit 100 updates the lock register 107C and registers the address C as a locking-target address and locks the address C (1513). Due to the address C being locked, the locking of the address A is released.

After the locking of the address A by the core 1 has been released, when the pipeline 101 of the primary cache control unit 100 of the core 0 attempts to carry out a move-in for the data of the address A in order to execute a CAS instruction, because the address A is not locked, the data of the address A is moved-in from the primary cache memory of the core 1 to the primary cache memory of the core 0 (1504). In this way, when the data of the address A is deleted from the primary cache memory of the core 1 despite it being prior to the completion of the CAS instruction implemented by the core 1, the CAS instruction by the core 1 is stalled without being able to complete (1514).

Thereafter, when the processing of process 1502 and thereafter is repeated, the core 0 and the core 1 compete for the data of the address A prior to the completion of a CAS instruction, processing stalls mutually occur, and the processing performance of the processor may decline.

Figure 7:
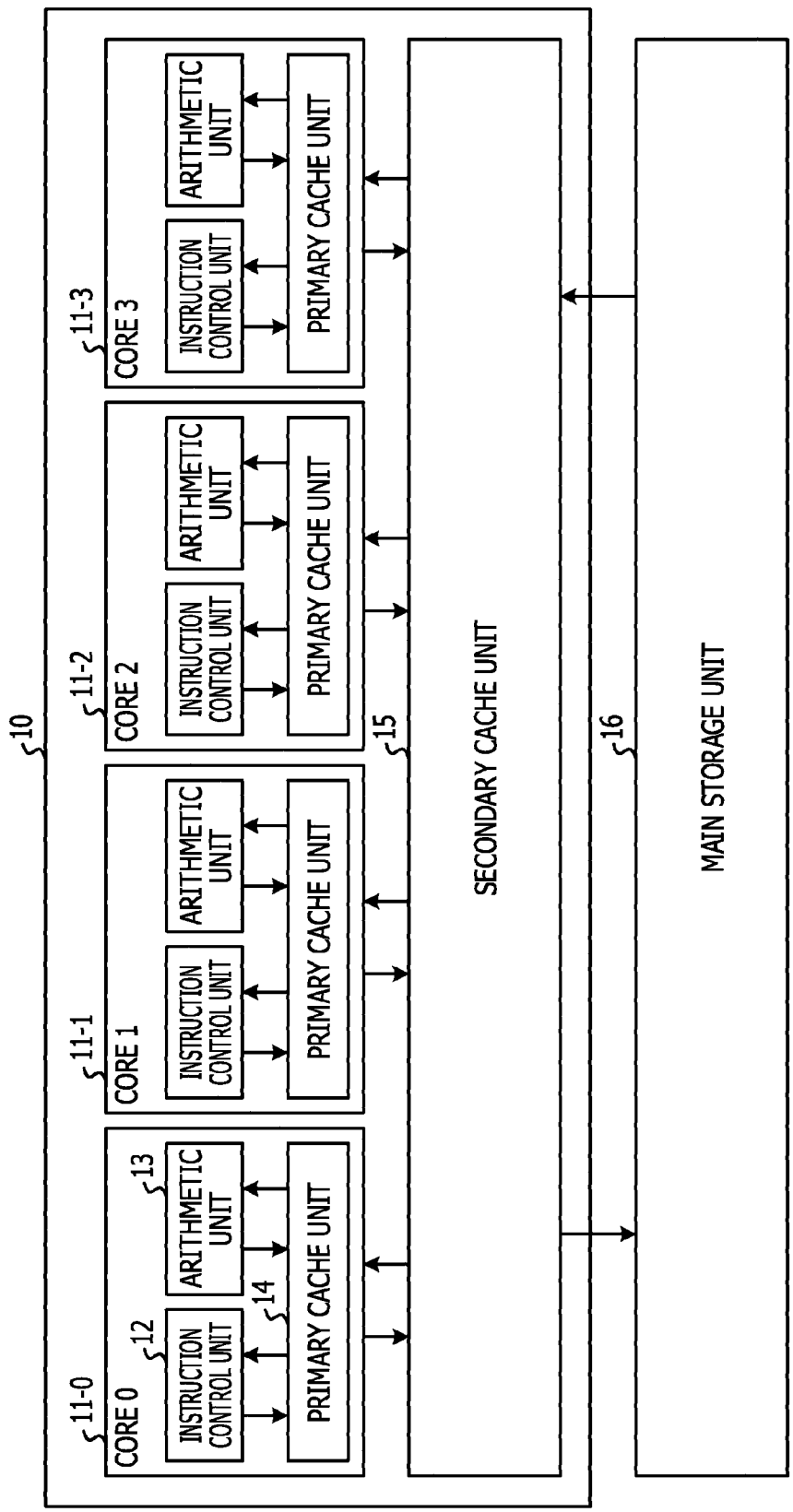
FIG. 7 depicts an example of an arithmetic processing device.

FIG. 7 depicts an example of an arithmetic processing device. The arithmetic processing device depicted in FIG. 7 may be a processor 10, for example. The processor 10 includes a plurality of cores 11 that each function as an arithmetic processing unit, and a secondary cache unit 15.

In FIG. 7, four cores 11-0 to 11-3 are depicted; however, the quantity of the cores 11 possessed by the processor 10 as an arithmetic processing device may be any number. In FIG. 7, one secondary cache unit 15 is depicted; however, the quantity of secondary cache units 15 possessed by the processor 10 may be any number. For example, the processor 10 may have a plurality of secondary cache units 15, and one secondary cache unit 15 may be made to correspond to each set of the cores 11, which have been divided into a plurality of sets, and the secondary cache units 15 may be shared by the plurality of cores 11.

Each of the cores 11 includes an instruction control unit 12, an arithmetic unit 13, and a primary cache unit 14. The instruction control unit 12 controls the execution of instructions, and requests processing corresponding to the instructions. The arithmetic unit 13 performs arithmetic in accordance with the control implemented by the instruction control unit 12.

The primary cache unit 14 includes a primary cache control unit that receives requests from the instruction control unit 12, and a primary cache memory that retains data, and carries out processing for the requests from the instruction control unit 12. For example, when a data transfer request is received from the instruction control unit 12, the primary cache control unit of the primary cache unit 14 returns the requested data if that data is present the primary cache memory, and issues a data transfer request to the secondary cache unit 15 if the data is not present.

The secondary cache unit 15 includes a secondary cache control unit that receives requests from the primary cache units 14 of the cores 11, and a secondary cache memory that retains data. For example, when a data transfer request is received from a primary cache unit 14, the secondary cache control unit of the secondary cache unit 15 returns the requested data if that data is present in the secondary cache memory, and issues a data transfer request to an external main storage unit 16 if the data is not present.

Figure 8:
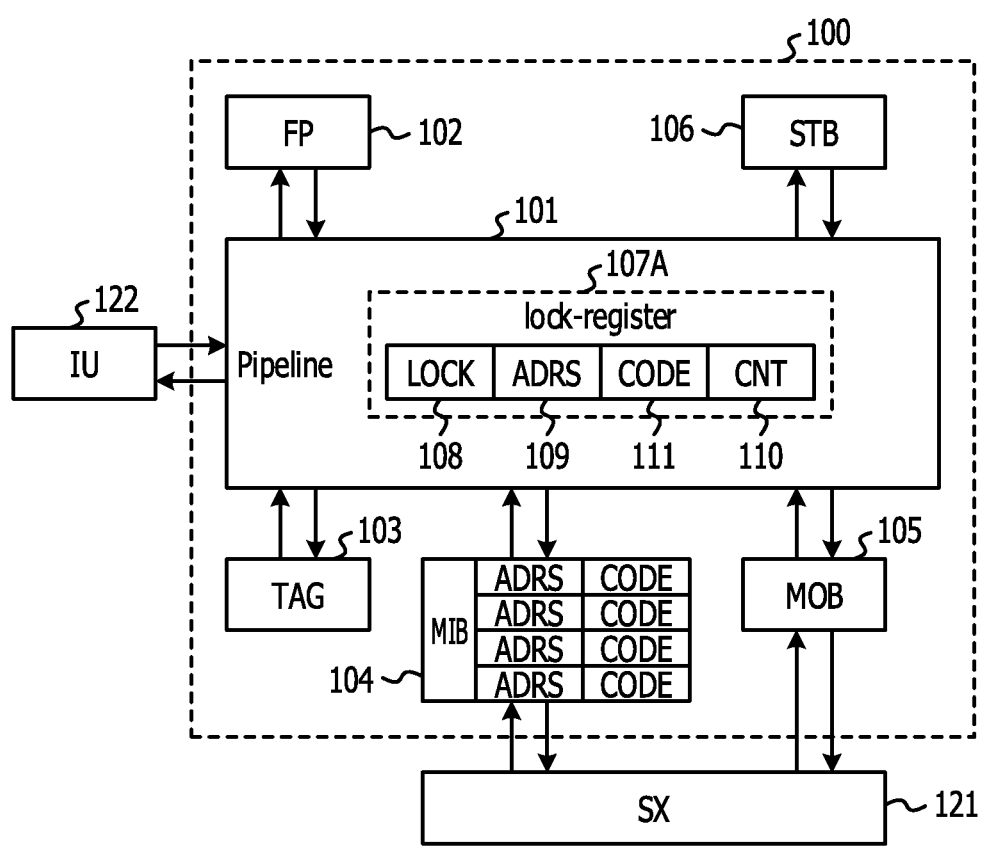
FIG. 8 depicts an example of a primary cache unit.

FIG. 8 depicts an example of a primary cache unit. In FIG. 8, a primary cache unit possessed by each core 11 depicted in FIG. 7 is depicted. The primary cache control unit 100 depicted in FIG. 8 includes a pipeline.

The pipeline 101 of the primary cache control unit 100 receives a request from an instruction control unit (IU) 122 that controls the execution of instructions and so forth, and executes processing corresponding to the request. The pipeline 101 exchanges data and so forth with a fetch port (FP) 102, a tag unit (TAG) 103, a move-in buffer (MIB) 104, a move-out buffer (MOB) 105, or a store buffer (STB) 106.

The pipeline 101 includes the five stages of a priority stage (P), a TAG/TLB access stage (T), a matching stage (M), a buffer access stage (B), and a result stage (R). The pipeline 101 may have five stages; however, the quantity of the stages may be any number. For example, a pipeline having four stages may be used.

In the priority stage, requests to be inserted into the pipeline processing are selected and inserted in accordance with the order of priority. In the TAG/TLB access stage, a TAG memory in which tag data and so forth is retained is accessed, conversion from virtual addresses to physical addresses is carried out in a translation lookaside buffer (TLB), and cache memory access is carried out.

In the matching stage, the output from the TAG memory and the physical address converted by the TLB are compared, and a read-out way of the cache method is determined. In the buffer access stage, the result of the matching stage is used to select the way, and data is passed to the arithmetic unit. In the result stage, a checking result regarding data correctness in the buffer access stage is reported.

The fetch port 102 includes a plurality of entries in which requests are retained, and retains requests issued from the instruction control unit 122. The requests retained in the fetch port 102 are read out of order and are inserted into the pipeline 101. The tag unit 103 carries out tag searches and so forth for determining whether or not the data requested by the requests is present in the primary cache memory.

The move-in buffer 104 exchanges processing data regarding move-ins, which cause data for which a cache miss has occurred to be transferred to the primary cache memory, with a secondary cache control unit (SX) 121 of the secondary cache unit 15 shared by the plurality of cores. The move-in buffer 104 may include a plurality of entries in which requests that include addresses (ADRS) and instruction group codes (CODE) are retained.

The move-out buffer 105 exchanges processing data regarding move-outs, which eject data from the primary cache memory, with the secondary cache control unit 121. The store buffer 106 includes a plurality of entries in which store requests are retained, and retains store requests issued from the instruction control unit 122. The store requests retained in the store buffer 106 are read out of order and are inserted into the pipeline 101.

A lock register 107A may be a register that retains addresses that are locked by the pipeline 101, and may be allocated to each core. The lock register 107A includes a field 108 that retains a lock flag (LOCK) indicating whether or not locking is in effect, a field 109 that retains a locking-target address (ADRS), a field 111 that retains an instruction group code (CODE), and a counter (CNT) 110. The group codes may be information that indicates the priorities of instructions, and may be code values which have values that differ depending on the priorities of the instructions.

Operations performed, by cores other than the core corresponding to the lock register 107A, with respect to the locking-target address registered in the lock register 107A in which the lock flag has been set (locked state) are prohibited. The lock register 107A is updated based on the execution of move-ins, and one address may be locked by each core at any given point in time. To ensure that the locked state does not continue, the counter 110 measures time, and the lock flag is cleared and the lock is released when a certain period of time elapses.

For example, in the counter 110, the initial value may be set at 0, and the value is incremented by 1 when a clock signal is input. For example, the value of the counter 110 is proportional to the elapsed time from a locking-target address being locked. As the counter 110, a counter with which the output value is proportional to the elapsed time from a locking-target address being locked may be used. If the value of the counter 110 reaches a threshold value, the lock flag of the lock register 107A is cleared, and the locking of the registered address is released.

Figure 9:
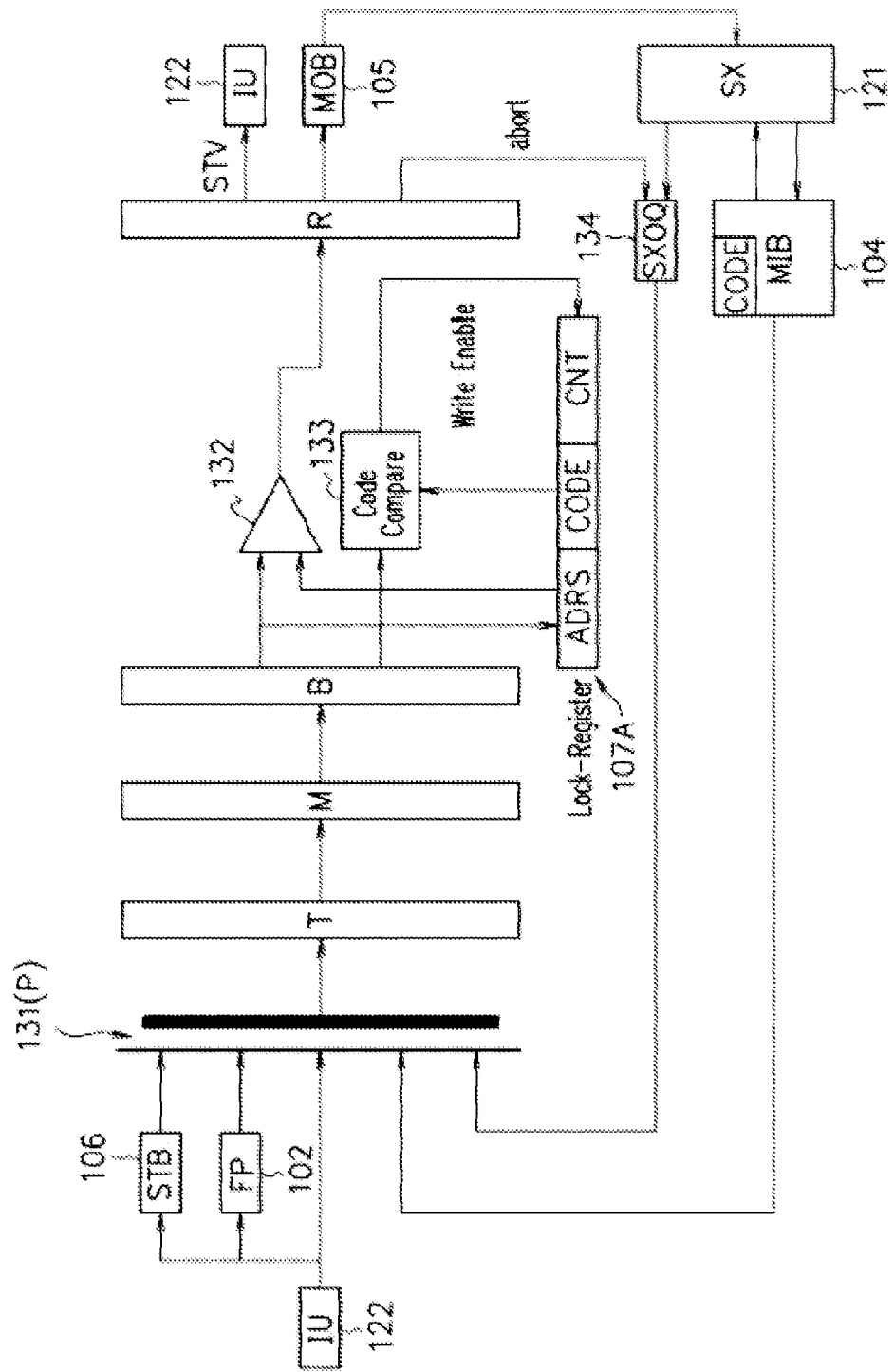
FIG. 9 depicts an example of a pipeline.

FIG. 9 depicts an example of a pipeline. In FIG. 9, the pipeline of the primary cache unit depicted in FIG. 8 is depicted. In FIG. 9, the same symbols are appended to elements having substantially the same or similar functions as the elements depicted in FIG. 8, and descriptions thereof may have been omitted or reduced.

A selection unit 131 that corresponds to the priority stage of the pipeline selects a request to be inserted into pipeline processing in accordance with the order of priority, from among requests issued by each of the fetch port 102, the move-in buffer 104, the store buffer 106, the instruction control unit 122, and a buffer (SXOQ) 134 that retains data requests from the secondary cache control unit 121. In FIG. 9, T, M, B, and R represent the TAG/TLB access stage, the matching stage, the buffer access stage, and the result stage of the pipeline, respectively.

An address comparison unit 132 compares an address at the buffer access stage (B) of a request being executed by the pipeline, and an address retained in the lock register 107A, and outputs the comparison result. If the comparison result output by the address comparison unit 132 indicates that the addresses match, and the request is a request relating to a data request issued from another core by way of the buffer 134, the request is aborted in the result stage of the pipeline.

A code comparison unit 133 compares a group code at the buffer access stage (B) of a request being executed by the pipeline, and a group code retained in the lock register 107A. If the priority based on the group code at the buffer access stage (B) is the same as or higher than the priority based on the group code retained in the lock register 107A, the code comparison unit 133 updates the lock register 107A. If the lock register 107A is not locking an address, the code comparison unit 133 updates the lock register 107A regardless of the group code comparison result. In the updating of the lock register 107A, the lock flag is set, the access-target address and the group code of the request being executed in the buffer access stage (B) are registered, and the counter is initialized.

The operations including the updating of a lock register and operations for lock control in which a lock register is used in FIG. 7 to FIG. 9 may be substantially the same as or similar to the operations depicted in FIG. 2 and FIG. 3. For example, when an instruction that involves locking is executed, different from the operation depicted in FIG. 2, it may be determined whether or not to update the lock register as depicted in FIG. 10, and registering in the lock register may be carried out in accordance with the determination result.

Figure 10:
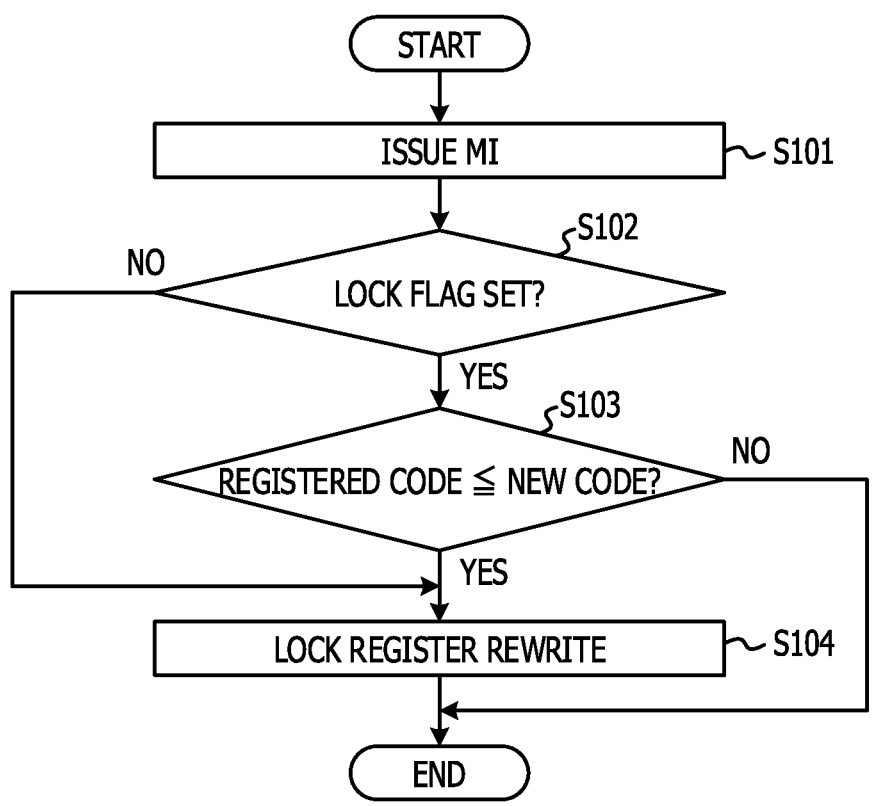
FIG. 10 depicts an example of a registration processing of a lock register.

FIG. 10 depicts an example of a registration processing of a lock register. In order to execute an instruction that involves locking such as an atomic instruction, a request for a move-in that causes the data of an access-target address to be stored in a primary cache memory is issued and inserted into the pipeline 101 of the primary cache control unit 100 (S101). The pipeline 101 of the primary cache control unit 100 confirms whether the lock flag of the lock register 107A has been set, for example, whether a locked state is in effect (S102).

If the result of the confirmation is that the lock flag has been set (YES in S102), the pipeline 101 of the primary cache control unit 100 determines whether or not to update the lock register, based on the value of the counter 110 and the group code of the instruction (S103). The pipeline 101 of the primary cache control unit 100 may determine to update the lock register if the value of the counter 110 has reached the threshold value. If the value of the counter 110 has not reached the threshold value, the pipeline 101 of the primary cache control unit 100 compares a group code (registered code) registered in the lock register and the group code (new code) of a request from the move-in buffer 104, and may determine to update the lock register if the priority based on the new code is the same as or higher than the priority based on the registered code. For example, if the value of the counter 110 has not reached the threshold value, the pipeline 101 of the primary cache control unit 100 may determine to not update the lock register if the priority based on the registered code is higher than the priority based on the new code.

FIG. 11 depicts an example of a truth value table for updating a lock register. For example, from among instructions that involve locking, the priority of CAS instructions may be set to be high (for example, group code=1), and the priority of instructions other than CAS instructions may be set to be low (for example, group code=0). In this case, the pipeline 101 of the primary cache control unit 100 determines whether to update (true) the lock register or not (false), in accordance with the truth value table depicted in FIG. 11. For example, if the value of the counter 110 has the highest priority, and the value of the counter 110 has reached the threshold value, the lock register 107A may be updated. A new CAS instruction, for example, a CAS instruction from the move-in buffer 104, may have the second priority, a locked CAS instruction may have the third priority, and instructions other than a new CAS, for example, instructions (/CAS instruction) from the move-in buffer 104, may have the fourth priority.

If the lock flag has not been set (NO in S102), or, based on the determination made in operation S103, it has been determined that the lock register has been updated (YES in S103), the pipeline 101 of the primary cache control unit 100 performs a rewrite of the lock register 107A (S104). In the rewrite of the lock register 107A, the lock flag is set, and also the access-target address and the group code of the request from the move-in buffer 104 are registered. Based on the determination made in operation S103, if it is determined that the lock register has not been updated (NO in S103), the pipeline 101 of the primary cache control unit 100 suppresses the updating of the lock register 107A, and continues with processing relating to a move-in without performing a rewrite of the lock register 107A.

Figure 12:
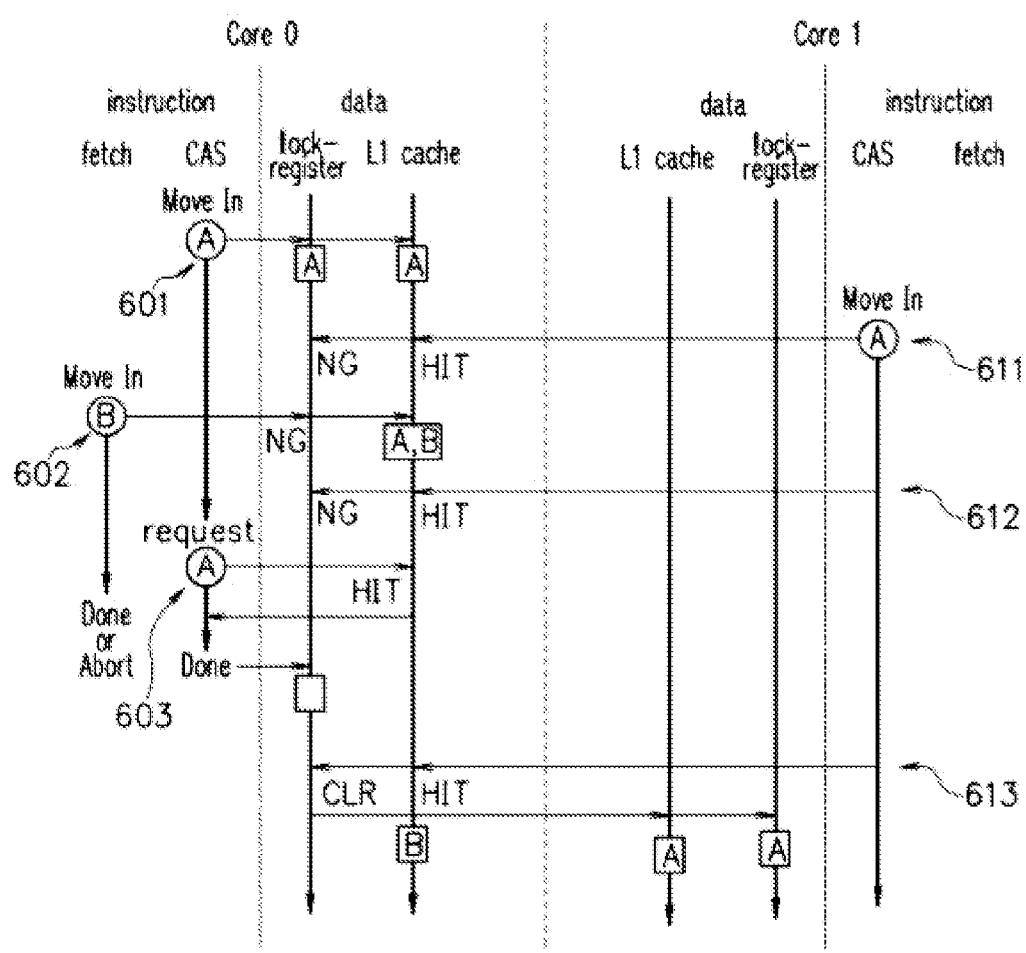
FIG. 12 depicts an example of an operation of an arithmetic processing device.

FIG. 12 depicts an example of an operation of an arithmetic processing device. FIG. 12 depicts lock control that uses a lock register in the case where, in a processor, a plurality of cores execute an instruction involving locking that includes therein a plurality of processes that are continuously performed, for example, a CAS instruction or a page table fetch instruction. A CAS instruction may have a higher priority than a page table fetch instruction. When the operation depicted in FIG. 12 is started, in the lock registers 107A of the core 0 and the core 1, the lock flags are cleared; for example, the locking of an address is not carried out.

In order for a CAS instruction for an access-target address A to be executed by the core 0, the pipeline 101 of the primary cache control unit 100 of the core 0 stores the data of the address A for which a cache miss has occurred, in the primary cache memory by using a move-in. At this time, because the lock flag of the lock register 107A of the core 0 has not been set, the pipeline 101 of the primary cache control unit 100 updates the lock register 107A, sets the lock flag, and also registers the group code of the CAS instruction and the address A as a locking-target address and locks the address A (601). Due to the core 0 having locked the address A, a move-in for the data of the address A by the core 1 in order to execute a CAS instruction for the access-target address A in the core 1 is aborted (611).

After the core 0 has locked the address A, in order for the core 0 to execute a page table fetch instruction for an access-target address B that is the subsequent instruction, the pipeline 101 of the primary cache control unit 100 of the core 0 stores the data of the address B for which a cache miss has occurred, in the primary cache memory by using a move-in. At this time, the pipeline 101 of the primary cache control unit 100 compares the group code registered in the lock register 107A and the group code of the request from the move-in buffer 104, for example, the group code of the page table fetch instruction. Because the priority of the page table fetch instruction based on the group code is lower than the priority of the CAS instruction, the pipeline 101 of the primary cache control unit 100 determines to not update the lock register 107C. Therefore, the lock register 107C retains the address A as the locking-target address, and the locking of the address A continues (602).

Thereafter, even if a move-in for the address A is retried by the core 1, because the locking of the address A by the core 0 continues, the move-in for the data of the address A by the core 1 is aborted (612). The pipeline 101 of the primary cache control unit 100 of the core 0 executes the processing of the CAS instruction (603). After the processing of the CAS instruction has been completed, the pipeline 101 of the primary cache control unit 100 of the core 0 updates the lock register 107C and clears the lock flag. For example, the locking of the address A by the core 0 is released, and access to the address A by all of the cores is allowed.

When a move-in for the address A by the core 1 is retried, because the address A is not locked, the data of the address A is moved-in from the primary cache memory of the core 0 to the primary cache memory of the core 1. At this time, because the lock flag of the lock register of the core 1 has not been set, the pipeline 101 of the primary cache control unit 100 of the core 1 updates the lock register 107A, sets the lock flag, and also registers the group code of the CAS instruction and registers the address A as a locking-target address and locks the address A (613).

Due to the control described above, there may be a decrease in the deletion of the data of the address A from the primary cache memories of the cores prior to the CAS instruction for the address A being completed. There may be a decrease in the number of times that CAS instruction processing stalls, and the processing performance of the processor may improve.

Figure 13:
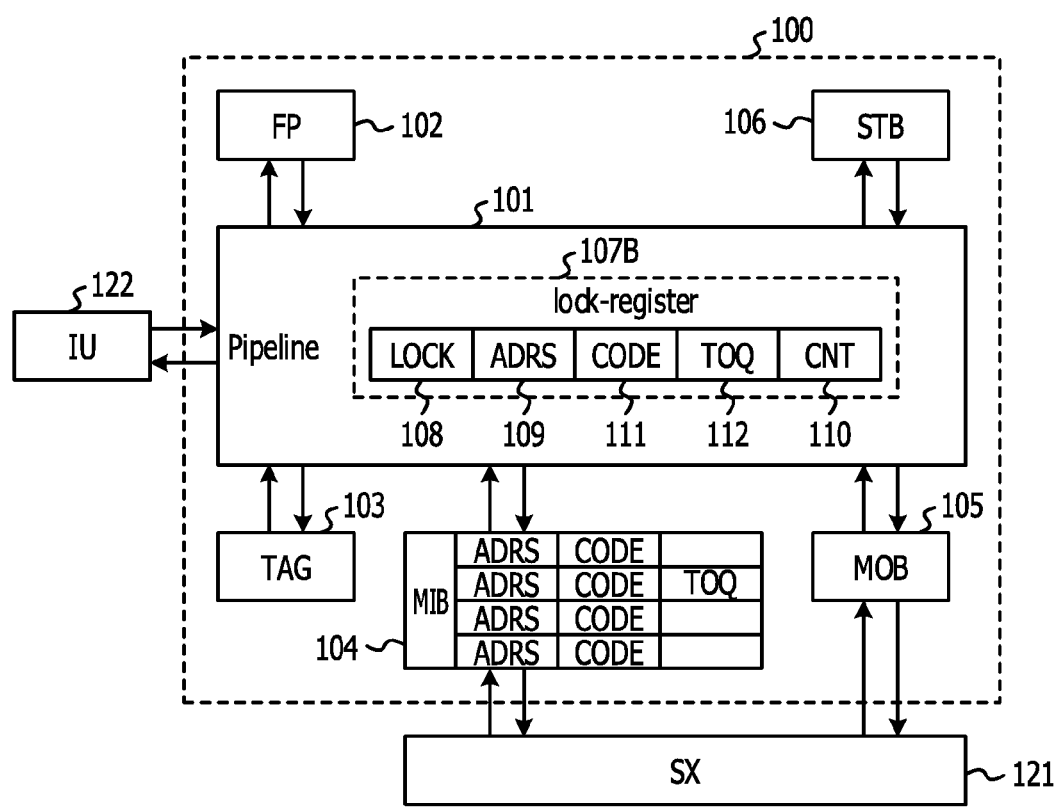
FIG. 13 depicts an example of a lock register.

If the lock flag is set in the lock register, the pipeline 101 of the primary cache control unit 100 determines whether or not to update the lock register, based on the value of the counter and the group code of the instruction. FIG. 13 depicts an example of a lock register. As depicted in FIG. 13, the lock register 107B may be provided with a field 112 that stores TOQ information that indicates whether or not an instruction having a locked address is top of the queue (TOQ) when acquired from the move-in buffer 104, for example, whether or not the instruction has been stored the longest. Based on whether or not a request is TOQ when acquired from the move-in buffer 104, the pipeline 101 of the primary cache control unit 100 may determine whether or not to update the lock register 107B. In FIG. 13, the same symbols are appended to elements that are substantially the same as or similar to the elements depicted in FIG. 8, and descriptions thereof may have been omitted or reduced.

In the case where whether or not a request is TOQ is taken into consideration, the pipeline 101 of the primary cache control unit 100 may determine to update the lock register if the value of the counter 110 has reached the threshold value. In the case where the value of the counter 110 has not reached the threshold value, the pipeline 101 of the primary cache control unit 100 may determine to update the lock register when a request from the move-in buffer 104 is a request that is TOQ. In the case where a request from the move-in buffer 104 is a request that is TOQ, and a request for which the address is locked is a request that is TOQ when acquired from the move-in buffer 104, being TOQ may not be taken into consideration as a condition for determining whether or not to update the lock register.

In the case where the value of the counter 110 has not reached the threshold value, and a request from the move-in buffer 104 is a request that is not TOQ, the pipeline 101 of the primary cache control unit 100 compares a group code (registered code) registered in the lock register and the group code (new code) of the request from the move-in buffer 104. In the case where the priority based on the new code is the same as or higher than the priority based on the registered code, the pipeline 101 may determine to update the lock register. In the case where the value of the counter 110 has not reached the threshold value, and the request from the move-in buffer 104 is a request that is not TOQ, the pipeline 101 may determine to not carry out an update of the lock register if the request having a locked address is a request that is TOQ when acquired from the move-in buffer 104.

FIG. 14 depicts an example of a truth value table. In FIG. 14, a truth value table for updating the lock register depicted in FIG. 13 is depicted. For example, from among instructions that involve locking, the priority of CAS instructions may be set to be high (for example, group code=1), and the priority of instructions other than CAS instructions may be set to be low (for example, group code=0). In this case, the pipeline 101 of the primary cache control unit 100 determines whether to update (true) the lock register or not (false), in accordance with the truth value table depicted in FIG. 14. For example, if the value of the counter 110 has the highest priority, and the value of the counter 110 has reached the threshold value, the lock register 107B is updated. For example, the lock register 107B may be updated invariably. An instruction that is TOQ may have the second priority, a CAS instruction may have the third priority, and an instruction (/CAS instruction) other than a CAS may have the fourth priority. If the compared instructions are both CAS instructions, the new CAS instruction, for example, a CAS instruction from the move-in buffer 104, may be given priority. If the compared instructions are both instructions other than a CAS, the new instruction that is not a CAS, for example, an instruction (/CAS instruction) from the move-in buffer 104 for example, may be given priority.

For example, two priorities may be set for CAS instructions and instructions other than CAS instructions. Three or more priorities for instructions may be set. FIG. 15 depicts an example of an updating of a lock register. In FIG. 15, four priorities are set. In FIG. 15, CAS indicates a CAS instruction, ST1 indicates a store instruction, TRF indicates a page table fetch instruction, and IU indicates an instruction other than the aforementioned (hereafter, other instructions). The priorities for determining whether or not to update the lock register if the lock flag is set in the lock register are as follows.

The priority of a TOQ request for a CAS instruction is the highest, and the priority of a request for a store instruction is lower than the priority of a TOQ request for a CAS instruction (CAS*TOQ>ST1). The priority of a TOQ request for a page table fetch instruction is lower than the priority of a request for a store instruction (ST1>TRF*TOQ), and the priority of a TOQ request for other instructions is lower than the priority of a TOQ request for a page table fetch instruction (TRF*TOQ>IU*TOQ). The priority of a non-TOQ request for a CAS instruction is lower than the priority of a TOQ request for other instructions (IU*TOQ>CAS*/TOQ), and the priority of a non-TOQ request for a page table fetch instruction is lower than the priority of a non-TOQ request for a CAS instruction (CAS*/TOQ>TRF*/TOQ). The priority of a non-TOQ request for other instructions is lower than the priority of a non-TOQ request for a page table fetch instruction (TRF*/TOQ>IU*/TOQ), and is the lowest.

The pipeline 101 of the primary cache control unit 100 determines whether or not to update the lock register in accordance with the priority, and if the priority of the subsequent instruction is the same as or higher than the priority of the preceding instruction, it is determined that the lock register is to be updated and the lock register is rewritten in accordance with the subsequent instruction. If the priority of the subsequent instruction is lower than the priority of the preceding instruction, it is determined that the lock register is not to be updated and the information of the lock register is retained.

In a multi-thread processor in which each core is able to execute a plurality of threads at the same time, instructions that involve locking may be executed in parallel by a plurality of threads within a certain core. In this kind of multi-thread processor, a plurality of lock registers may be mounted with respect to the each core. In this case, a plurality of lock registers are allocated with respect to one thread. When a lock register is updated, the pipeline 101 of the primary cache control unit 100 may determine, as described below, the lock register to be updated.

When a request for a move-in from the move-in buffer 104 has been performed, if the lock flags of all of the lock registers have been set, a lock register that is able to be rewritten is determined in accordance with the priorities, and the determined lock register is updated. At this time, if a plurality of lock registers are able to be rewritten, for example, the oldest from thereamong, for example, the lock register having the counter value that is closest to the threshold value, may be updated. If the result determined in accordance with the priorities is that there is no register that is able to be rewritten, lock register updating may not be performed.

When a request for a move-in from the move-in buffer 104 has been performed, a lock register having a cleared lock flag is updated. If there are plurality of lock registers having cleared lock flags, for example, a lock register having a low priority based on the group codes registered in the lock registers may be updated.

Priorities are set with respect to instructions that involve the locking of an address. If the priority of a preceding instruction that involves locking for which an address is registered in a lock register is the same as or lower than the priority of the subsequent instruction that involves locking, the lock register is updated and the access-target address of the subsequent instruction is locked. If the priority of the preceding instruction for which the address is registered in the lock register is higher than the priority of the subsequent instruction, the updating of the lock register is suppressed and the locking of the access-target address of the preceding instruction is continued. Therefore, there may be a decrease in the deletion of data that is used for the execution of an instruction involving locking from the primary cache memory of a core prior to the completion of the instruction. In addition, the number of times that instruction processing stalls may decrease, and the processing performance of the processor may improve.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An arithmetic processing device comprising:
an arithmetic core, wherein the arithmetic core comprises:

an instruction controller configured to request processing corresponding to an instruction;
a memory configured to store lock information indicating that a locking target address is locked, the locking target address, and priority information of the instruction; and
a cache controller configured to:
receive, when executing a first instruction including locking of a first address in a cache memory from the instruction controller, a second instruction including moving data corresponding to the first address to the cache memory;
determine whether the lock information is stored in the memory and whether a count value that is counted based on a clock signal from when locking of the first address in the cache memory reaches a threshold value;
update the lock information in the memory when the count value reaches the threshold value;
compare a first priority information in the memory and a second priority information corresponding to the second instruction when the lock information is stored in the memory and the count value does not reach the threshold value; and
update the lock information in the memory when a second priority of the second priority information is higher than a first priority of the first priority information and not-update the lock information in the memory when the second priority is not higher than the first priority.

2. The arithmetic processing device according to claim 1, wherein the cache controller comprises a comparator configured to compare the first priority information and the second priority information, and controls the updating of the memory based on a comparison result of the comparator.

3. The arithmetic processing device according to claim 1, wherein a determination of whether the lock information is stored in the memory and whether the count value reaches the threshold value is performed using a table including combinations each having a first content indicating whether the count value reaches the threshold value, a second content corresponding to the first priority information, a third content corresponding to the second priority information and a fourth information indicating whether an update is performed.

4. The arithmetic processing device according to claim 3, wherein the memory is a register, and the count value is stored in a portion of the register.

5. The arithmetic processing device according to claim 1, wherein the memory stores Top Of Queue (TOQ) information indicating that the first instruction is an oldest instruction, and the updating of the memory is suppressed based on the TOQ information.

6. The arithmetic processing device according to claim 5, wherein, when storing data of the first address in the cache memory to execute the first instruction, the cache controller suppresses the updating of the memory if the lock information and the TOQ information are stored in the memory and the first instruction is not the oldest instruction.

7. An arithmetic processing system comprising:
a plurality of arithmetic cores, wherein each of the plurality of arithmetic cores comprises:
an instruction controller configured to request processing corresponding to an instruction;
a memory configured to store lock information indicating that a locking target address is locked, the locking target address, and priority information of the instruction; and
a cache controller configured to;
receive, when executing a first instruction including locking of a first address in a cache memory from the instruction controller, a second instruction including moving data corresponding to the first address to the cache memory;
determine whether the lock information is stored in the memory and whether a count value that is counted based on a clock signal from when locking of the first address in the cache memory reaches a threshold value;
update the lock information in the memory when the count value reaches the threshold value;
compare a first priority information in the memory and a second priority information corresponding to the second instruction when the lock information is stored in the memory and the count value does not reach the threshold value; and
update the lock information in the memory when a second priority of the second priority information is higher than a first priority of the first priority information and not-update the lock information in the memory when the second priority is not higher than the first priority.

8. The arithmetic processing system according to claim 7, wherein the cache controller of a first arithmetic core in the plurality of arithmetic cores suppresses access from a second arithmetic core in the plurality of arithmetic cores to the locking target stored in the memory of the first arithmetic core.

9. The arithmetic processing system according to claim 8, comprising:
a second cache memory configured to be shared by the plurality of arithmetic cores.

10. The arithmetic processing system according to claim 7, wherein the cache controller comprises a comparator configured to compare the first priority information and the second priority information, and controls the updating of the memory based on a comparison result of the comparator.

11. The arithmetic processing system according to claim 7, wherein a determination of whether the lock information is stored in the memory and whether the count value reaches the threshold value is performed using a table including combinations each having a first content indicating whether the count value reaches the threshold value, a second content corresponding to the first priority information, a third content corresponding to the second priority information and a fourth information indicating whether an update is performed.

12. The arithmetic processing system according to claim 11, wherein the memory is a register, and the count value is stored in a portion of the register.

13. The arithmetic processing system according to claim 7, wherein the memory stores Top Of Queue (TOQ) information indicating that the first instruction is an oldest instruction, and the updating of the memory is suppressed based on the TOQ information.

14. The arithmetic processing system according to claim 13, wherein, when storing data of the first address in the cache memory to execute the first instruction, the cache controller suppresses the updating of the memory if the lock information and the TOQ information are stored in the memory and the first instruction is not the oldest instruction.

15. A method for controlling an arithmetic processing device, comprising:
- requesting, by a first arithmetic core, processing corresponding to a first instruction including locking of a first address in a cache memory;
- receiving, when executing the first instruction, a second instruction including moving data corresponding to the first address to the cache memory;
- determining whether a memory stores information indicating that a locking target address is locked, and whether a count value that is counted based on a clock signal from when locking of the first address in the cache memory reaches a threshold value;
- updating the lock information in the memory when the count value reaches the threshold value,
- comparing a first priority information in the memory and a second priority information corresponding to the second instruction when the information is stored in the memory and the count value does not reach the threshold value; and
- updating the lock information in the memory when a second priority of the second priority information is higher than a first priority of the first priority information and not-updating the lock information in the memory when the second priority is not higher than the first priority.

16. The method according to claim 15, wherein the determining is performed using a table including combinations each having a first content indicating whether the count value reaches the threshold value, a second content corresponding to the first priority information, a third content corresponding to the second priority information and a fourth information indicating whether an update is performed.

17. The method according to claim 16, wherein the count value is stored in a portion of the memory.

18. The method according to claim 15, wherein the memory stores Top Of Queue (TOQ) information indicating that the first instruction is an oldest instruction, and the updating of the memory is suppressed based on the TOQ information.

19. The method according to claim 18, further comprising:
- when storing data of the first address in the cache memory to execute a first instruction, suppressing the updating of the memory if the lock information and the TOQ information are stored in the memory and the first instruction is not the oldest instruction.

* * * * *